(12) United States Patent
Campbell et al.

(10) Patent No.: US 7,546,909 B2
(45) Date of Patent: Jun. 16, 2009

(54) LEVER ASSEMBLY AND MASTER CYLINDER

(75) Inventors: Darren J. Campbell, Menomonee Falls, WI (US); Christopher S. Jones, St. Francis, WI (US)

(73) Assignee: Hayes Bicycle Group, Inc., Mequon, WI (US)

( * ) Notice: Subject to any disclaimer, the term of this patent is extended or adjusted under 35 U.S.C. 154(b) by 0 days.

(21) Appl. No.: 11/074,014

(22) Filed: Mar. 7, 2005

(65) Prior Publication Data

US 2005/0199450 A1    Sep. 15, 2005

Related U.S. Application Data

(60) Provisional application No. 60/551,537, filed on Mar. 9, 2004.

(51) Int. Cl.
*B62L 3/00* (2006.01)
(52) U.S. Cl. .................. 188/24.22; 188/24.15
(58) Field of Classification Search ... 188/24.11–24.15, 188/24.19, 24.22; 74/502.2, 525, 502.6, 74/522
See application file for complete search history.

(56) References Cited

U.S. PATENT DOCUMENTS

| | | | |
|---|---|---|---|
| 3,802,200 A | 4/1974 | Kolm | 60/594 |
| 4,038,823 A | 8/1977 | Mostert | |
| 4,200,163 A | 4/1980 | Bass et al. | |
| 4,506,507 A | 3/1985 | Wimbush | |
| 4,626,045 A | 12/1986 | Takei et al. | 303/119 |
| 4,635,442 A | 1/1987 | Bass | 60/594 |
| 4,658,585 A | 4/1987 | Kamemoto | |
| 4,779,482 A | 10/1988 | Kawaguchi | 74/523 |
| 4,785,629 A | 11/1988 | Ennis et al. | |
| 4,878,346 A | 11/1989 | Metzelfeld et al. | 60/588 |

(Continued)

FOREIGN PATENT DOCUMENTS

DE    85 27 989    11/1985

(Continued)

OTHER PUBLICATIONS

Formula Evoluzione 9.5 Operating Manual, 2003, English Version, Autor: Formula, an Italian Corporation.

(Continued)

*Primary Examiner*—Robert A Siconolfi
*Assistant Examiner*—Vu Q Nguyen
(74) *Attorney, Agent, or Firm*—Whyte Hirschboeck Dudek SC

(57) ABSTRACT

A lever assembly and a master cylinder are provided. The lever assembly includes a lever and an adjuster mechanism that changes the mechanical advantage of the lever. The reach of the lever relative to a handlebar can be adjusted. Both the mechanical advantage and reach of the lever can be adjusted without tools and while a vehicle including the same is operated. The master cylinder includes a reservoir in a clamp area. A reservoir bladder fits into the reservoir. A cover encloses the bladder and includes a vent opening making the bladder at atmospheric pressure such that air can move into the bladder and out of the bladder. The master cylinder can be bled without reorienting the master cylinder. A method of adjusting a mechanical advantage of a lever and a method of bleeding a braking system without reorienting the master cylinder are also provided.

22 Claims, 7 Drawing Sheets

U.S. PATENT DOCUMENTS

| | | | |
|---|---|---|---|
| 5,050,381 A | 9/1991 | Matsuno et al. | 60/584 |
| 5,448,927 A | 9/1995 | Lumpkin | 74/502.2 |
| 5,515,743 A | 5/1996 | Lumpkin | 74/502.2 |
| 5,533,599 A * | 7/1996 | Sule | 188/344 |
| 5,632,362 A | 5/1997 | Leitner | 188/344 |
| 5,636,518 A | 6/1997 | Burgoyne et al. | 60/594 |
| 5,813,501 A * | 9/1998 | Terry, Sr. | 188/344 |
| 5,910,193 A * | 6/1999 | Chen | 74/489 |
| 6,003,639 A | 12/1999 | Buckley et al. | 188/26 |
| 6,085,523 A | 7/2000 | Buckley et al. | 60/585 |
| 6,161,448 A | 12/2000 | Wang et al. | 74/502.2 |
| 6,318,514 B1 * | 11/2001 | Hinkens et al. | 188/73.38 |
| 6,336,327 B1 | 1/2002 | Noro et al. | 60/533 |
| 6,370,877 B1 | 4/2002 | Lin | 60/588 |
| 6,457,378 B2 | 10/2002 | Hatakoshi et al. | 74/525 |
| 6,491,137 B2 | 12/2002 | Lumpkin et al. | |
| 6,739,133 B2 * | 5/2004 | Barnett | 60/594 |
| 6,804,961 B2 | 10/2004 | Lumpkin | |
| 7,249,661 B2 | 7/2007 | Becocci | |
| 2003/0101722 A1 | 6/2003 | Barnett | 60/533 |
| 2003/0106754 A1 | 6/2003 | Buckley et al. | 188/359 |
| 2003/0121262 A1 | 7/2003 | Lumpkin | 60/594 |
| 2003/0121736 A1 * | 7/2003 | Lumpkin | 188/151 R |
| 2003/0121739 A1 | 7/2003 | Lumpkin | 188/344 |
| 2005/0056110 A1 | 3/2005 | Laghi et al. | 74/489 |
| 2005/0056508 A1 | 3/2005 | Laghi | 188/344 |
| 2005/0115238 A1 | 6/2005 | Becocci et al. | 60/584 |

FOREIGN PATENT DOCUMENTS

| | | |
|---|---|---|
| DE | 4408741 * | 10/1994 |
| DE | 197 18 612 A1 | 11/1998 |
| DE | 200 15 042 | 11/2000 |
| DE | 200 18 705 U1 | 12/2000 |
| EP | 0 430 835 | 6/1991 |
| GB | 2321682 | 8/1998 |
| WO | WO 02/44009 | 6/2002 |

OTHER PUBLICATIONS

Website http://www.formula-brake.it/htm/oro.asp.
Website http://www.apracing.com/motorcycle/cylinder/index.htm.
excel sports Golden Anniversary Issue, © 2000, Avid levers at top right of p. 21.

* cited by examiner

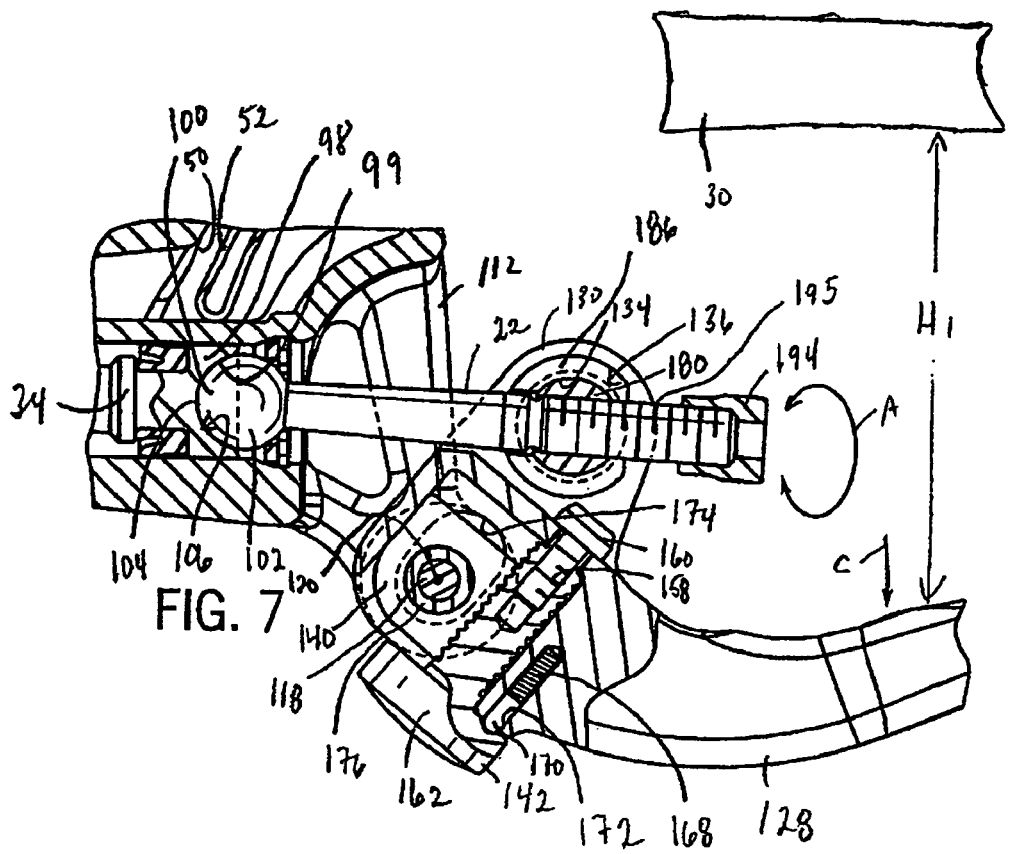
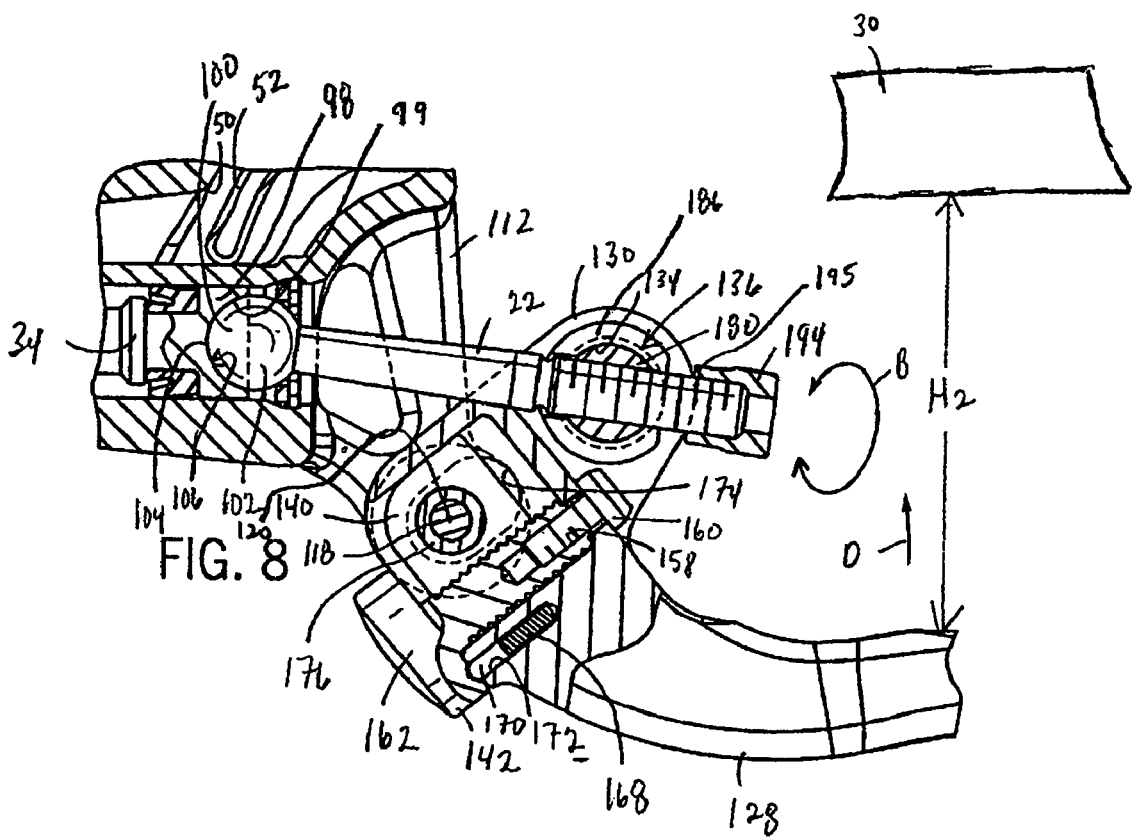

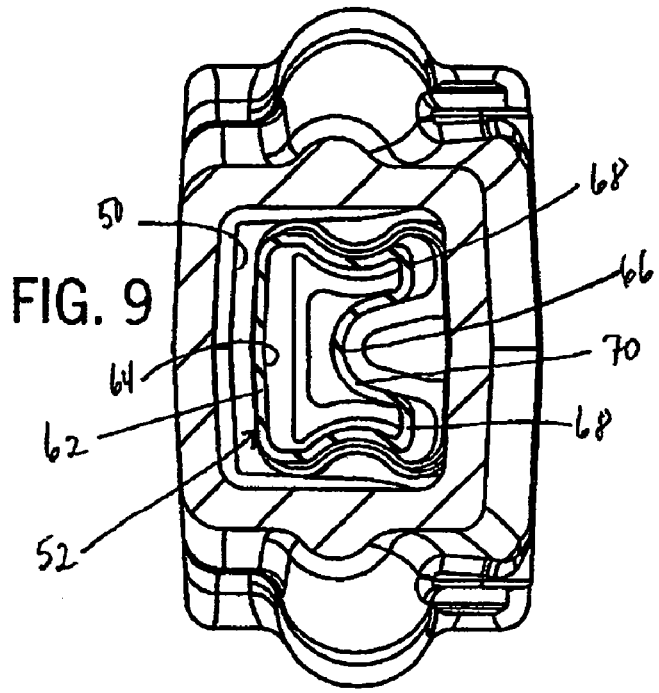
FIG. 9
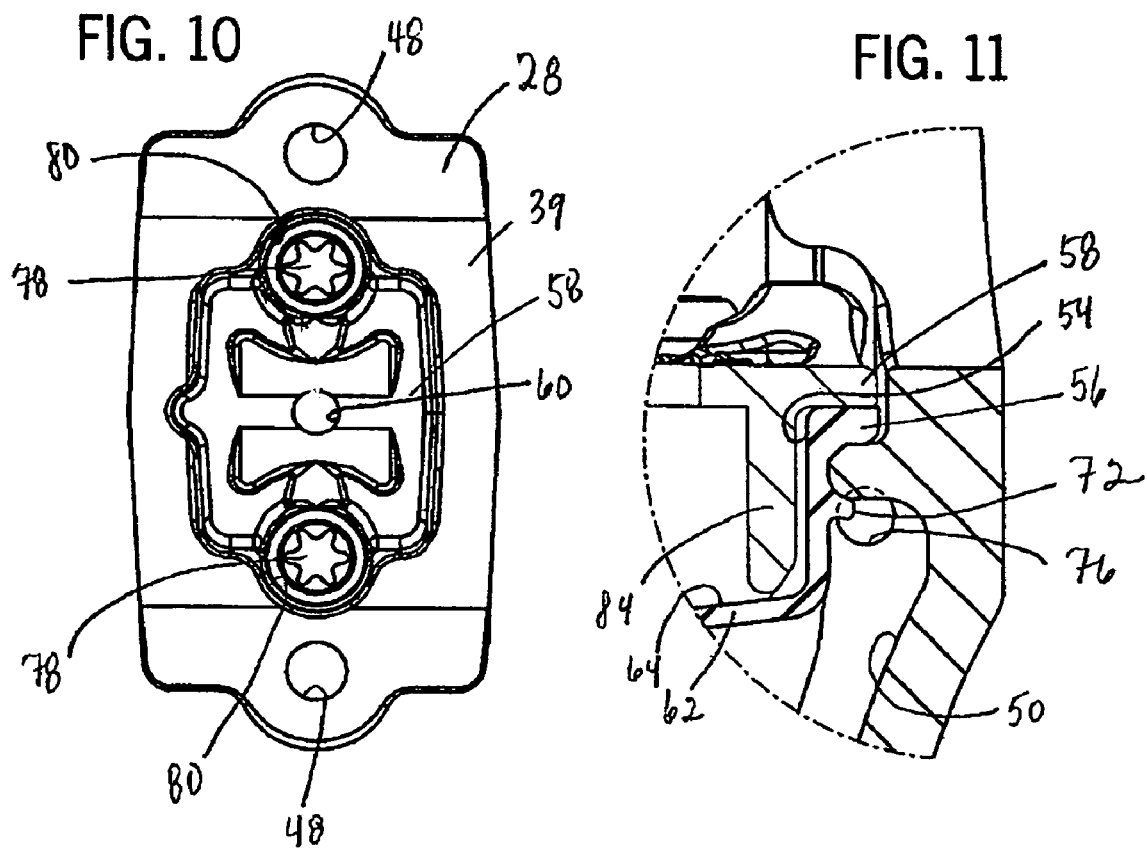
FIG. 10
FIG. 11

LEVER ASSEMBLY AND MASTER CYLINDER

CROSS-REFERENCE TO RELATED APPLICATIONS

This application claims priority under 35 U.S.C. §119(e) to U.S. Provisional Patent Application No. 60/551,537, filed Mar. 9, 2004, the entirety of which is incorporated by reference herein.

FIELD OF THE INVENTION

The invention relates to brakes and more particularly to disc brakes.

DESCRIPTION OF THE RELATED ART

Disc brake systems are used in a wide variety of applications such as bicycles, motorcycles, snowmobiles, ATVs, and automobiles. The typical disc brake system includes 1) a lever, 2) a power source, such as a hydraulic master cylinder, and 3) a disc brake assembly that is actuated by the power source to apply the brake force. The disc brake assembly includes a disc that rotates with the wheel, one or more brake pads, and one or more calipers. Force exerted on the lever actuates the power source, which selectively forces a caliper piston towards the disc to press the brake pad into frictional contact with the disc, thereby applying the brake force.

The lever's position relative to a handlebar typically is fixed, making the lever height comfortable for only some vehicle operators. Operators with hands that are larger or smaller find operating levers with a fixed height difficult.

The mechanical advantage of a lever can be defined as a length of an input arm divided by the length of an output arm. Thus, for a substantially fixed-length input arm, the shorter the length of an output arm, the higher the mechanical advantage. The mechanical advantage of a conventional lever for a hydraulic disc brake system is generally fixed, with after market modifications available. However, some operators of vehicles find it desirable to change the mechanical advantage as the vehicles are being operated. Operators of bicycles used in mountain biking and others find it is advantageous to be able to change the mechanical advantage of the brake levers on their bicycles while riding them. For example, increasing the mechanical advantage of the levers when descending steep hills reduces or eliminates hand fatigue.

Mountain biking is a form of cycling that uses very sturdy bicycles. Mountain biking takes place off road and includes both purely recreational cycling and competitive racing. There are multiple forms of racing, including cross country, down hill, free ride, dual slalom, four cross, and marathon. Size and weight of bike components, including the brake system, are often critical to the bicycle industry. A reduction in the size and weight of bike components, including the brake system, would be advantageous.

Bike riding generates high brake temperatures during long descents. High brake temperatures expand hydraulic fluid, requiring compensation in the hydraulic fluid system. However, traditional compensation systems again require increasing the size and weight of the brake system.

Hydraulic brakes require periodic fluid changes. This is typically done by forcing air, contaminated fluid, and/or old fluid and the like (hereinafter, often referred to plainly as old fluid or air for non-binding simplicity) through an upper bleed port by introducing pressurized new fluid through the lower bleed port. New fluid is introduced and the bleed ports are then closed. In previous systems, fluid changes required reorienting the master cylinder such that an upper bleed port is at a point above the top of a reservoir and the rest of the hydraulic system. The reorientation required either loosening or removing the master cylinder from its operating position. Once the fluid change was completed, the master cylinder was returned to its operating position. Reorienting the master cylinder was a tedious, cumbersome, and difficult task. With many traditional systems, new fluid is added at the master cylinder and forced from the system and bled at the lower bleed port. Other systems also often require removing a master cylinder cover and reservoir bladder to access the fluid.

In view of the foregoing, it would be desirable to provide a lever with an adjustment for the height of the lever. It would also be desirable to provide a lever with a mechanical advantage adjuster that can be adjusted while the vehicle is operated.

Additionally, it would be desirable to provide a master cylinder that can minimize size and weight and accommodate expansion of hydraulic fluid by incorporating a reservoir into a clamp area. In addition, it would be desirable to provide a master cylinder that can be bled without requiring reorienting the master cylinder.

SUMMARY OF THE INVENTION

The invention, which is defined by the claims set out at the end of this disclosure, is intended to solve at least some of the problems noted above. A lever assembly is provided and includes a lever and a mechanical advantage mechanism. The lever includes an input arm having a substantially fixed length and an output arm having a variable length. The lever is pivotal about a fixed fulcrum. The lever output arm is moveable with respect to the fulcrum. The adjuster mechanism is housed within the lever and pivots on the fulcrum. The adjuster mechanism changes a ratio of the output arm length to the input arm length to change the mechanical advantage of the lever.

The lever assembly can also include a coupling mechanism that adjusts a distance of the lever relative to a handlebar. The height of the lever relative to a handlebar can be adjusted without any tools and while a vehicle is operated.

In one embodiment, the adjuster mechanism includes a slider that pivots on the fulcrum and a thumbwheel coupled to the slider. Rotation of the thumbwheel slides the lever relative to the fulcrum to adjust the output arm length of the lever.

Also provided is a master cylinder having a body with a bore therethrough. A piston is slidably housed within the bore. A reservoir is in the clamp area of the master cylinder for a handlebar such that the reservoir is externally hidden from view. This decreases the size and weight of the braking system. The reservoir is fluidically coupled to the bore. A reservoir bladder fits into the reservoir. A cover encloses the bladder. The cover includes a vent opening making the bladder at atmospheric pressure such that air can move into the bladder and out of the bladder.

Braking systems are also provided and include a master cylinder, a rotatable disc, a caliper actuatable by the master cylinder to engage the rotatable disc, and a lever assembly. In one embodiment, the braking system includes the lever assembly described above. In another embodiment, the braking system includes the master cylinder described above. The braking system can also include both the lever assembly and the master cylinder described above.

A method of adjusting a hydraulic mechanical advantage of a lever is additionally provided. In it, a thumbwheel is rotated. The thumbwheel is coupled to a slider that pivots on a fixed fulcrum and that is housed within the lever. The lever slides with respect to the fulcrum. A ratio of an output arm length of the lever to an input arm length of the lever is adjusted. In one embodiment, the rotating step does not require locking the thumbwheel. In another embodiment, the method also includes exerting a force on an input arm of the lever. A force is applied on a hydraulic master cylinder via an output arm of the lever. In another embodiment, rotating the thumbwheel can occur during operation of a vehicle.

In addition, a method of bleeding a braking system of a vehicle is provided. In it, a lower bleed port and an upper bleed port on the braking system are opened. Lower pressure at the lower bleed port forces air, contaminated fluid, and/or old fluid and the like out of the system at the upper bleed port. New brake fluid under pressure is added to the braking system. Accordingly, the air, contaminated fluid, and/or old fluid and the like is removed from the braking system through the upper bleed port without reorienting the master cylinder of the braking system. The lower and the upper bleed ports are closed.

BRIEF DESCRIPTION OF THE DRAWINGS

Preferred exemplary embodiments of the invention are illustrated in the accompanying drawings, in which like reference numerals represent like parts throughout and in which:

FIGS. 7 and 8 are cross-sectional views of the lever height adjuster mechanism of FIGS. 2 and 3, with FIGS. 7 and 8 showing the lever at two different heights.

FIG. 9 is a cross-sectional view of the master cylinder through line 9-9 of FIG. 3, showing a bladder of the master cylinder.

FIG. 10 is a cross-sectional view of the master cylinder through line 10-10 of FIG. 3, showing a reservoir cover for the bladder.

FIG. 11 is an enlarged detail view of the area highlighted at arrow 11 in FIG. 3, showing a bleed port of a reservoir of the master cylinder.

Figure 1:
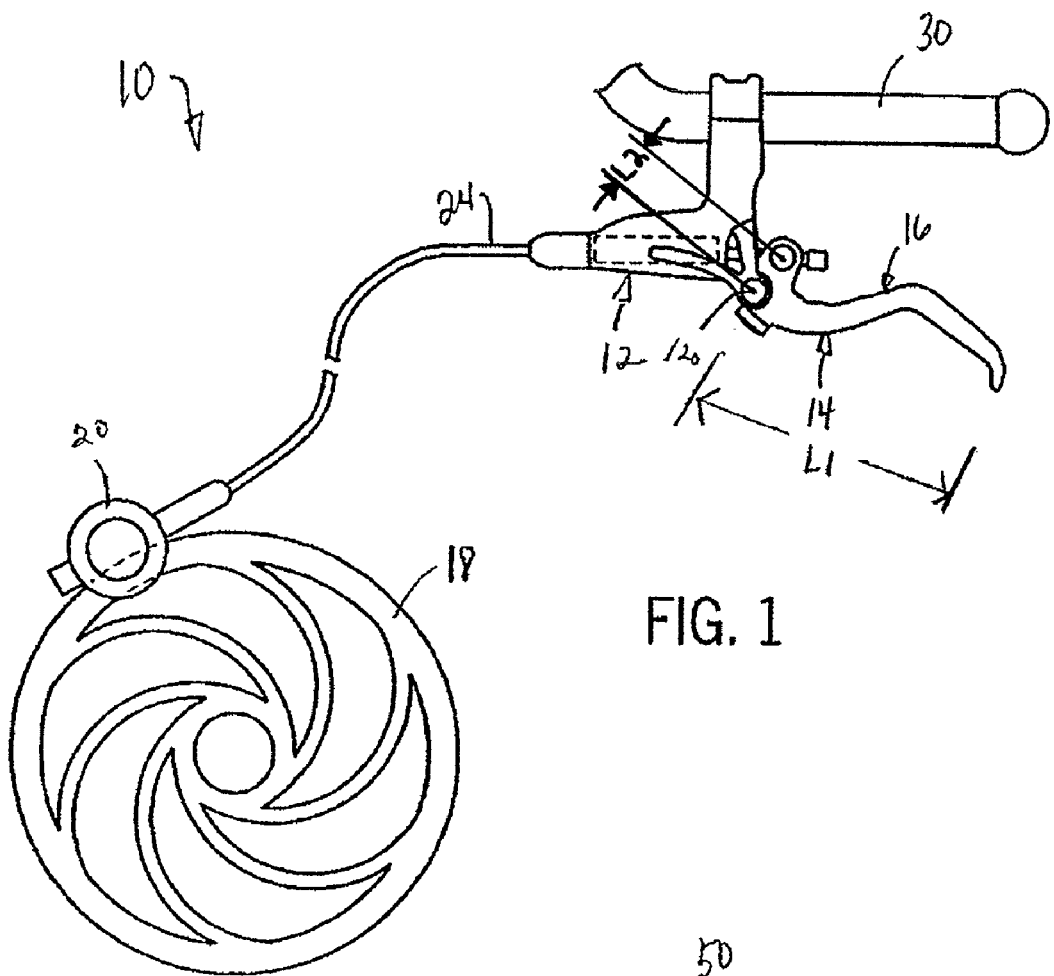
FIG. 1 is a schematic view of a braking system that includes a master cylinder, a rotatable disc, a caliper, and a lever assembly made in accordance with the invention.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

In the drawings, a first embodiment of a hydraulic braking system for a vehicle, such as a bicycle, constructed in accordance with the invention is illustrated in FIG. 1 at the reference numeral 10. For convenience, the braking system 10 will be described in connection with a bicycle. However, the braking system 10 can be used with other vehicles, such as motorcycles, mopeds, snowmobiles, ATVs, and the like, or any other vehicle using a hand-operated master cylinder. Therefore, the disclosure should not be limited to braking systems for use with bicycles. The braking system 10 includes a master cylinder 12, a lever assembly 14 that includes a lever 16, a rotatable disc 18, and a caliper 20, which is responsive to actuation of the master cylinder 12 to frictionally brake the disc 18.

Figure 2A:
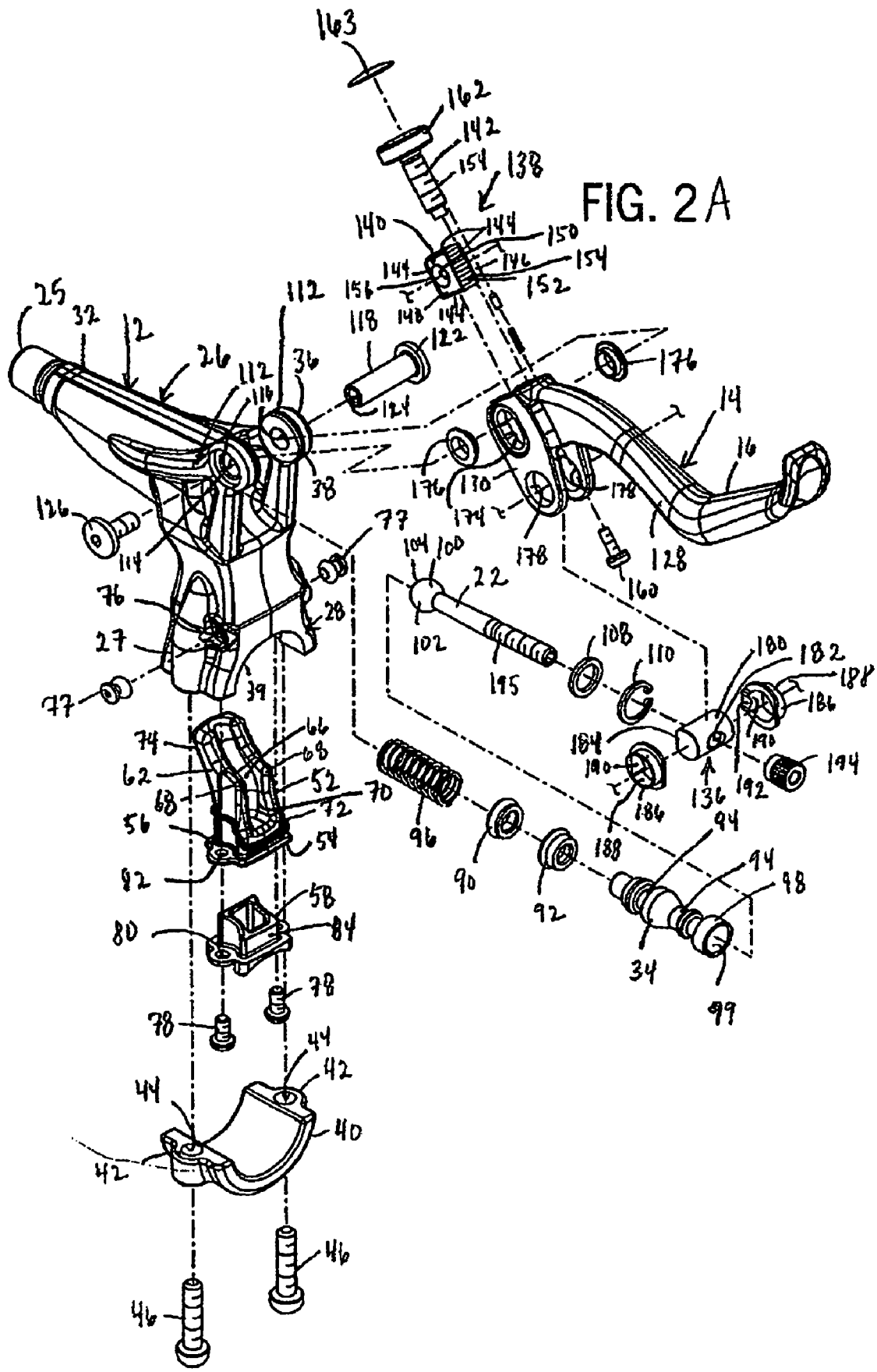
FIG. 2A is an exploded view of the master cylinder and the lever assembly of FIG. 1.
Figure 2B:
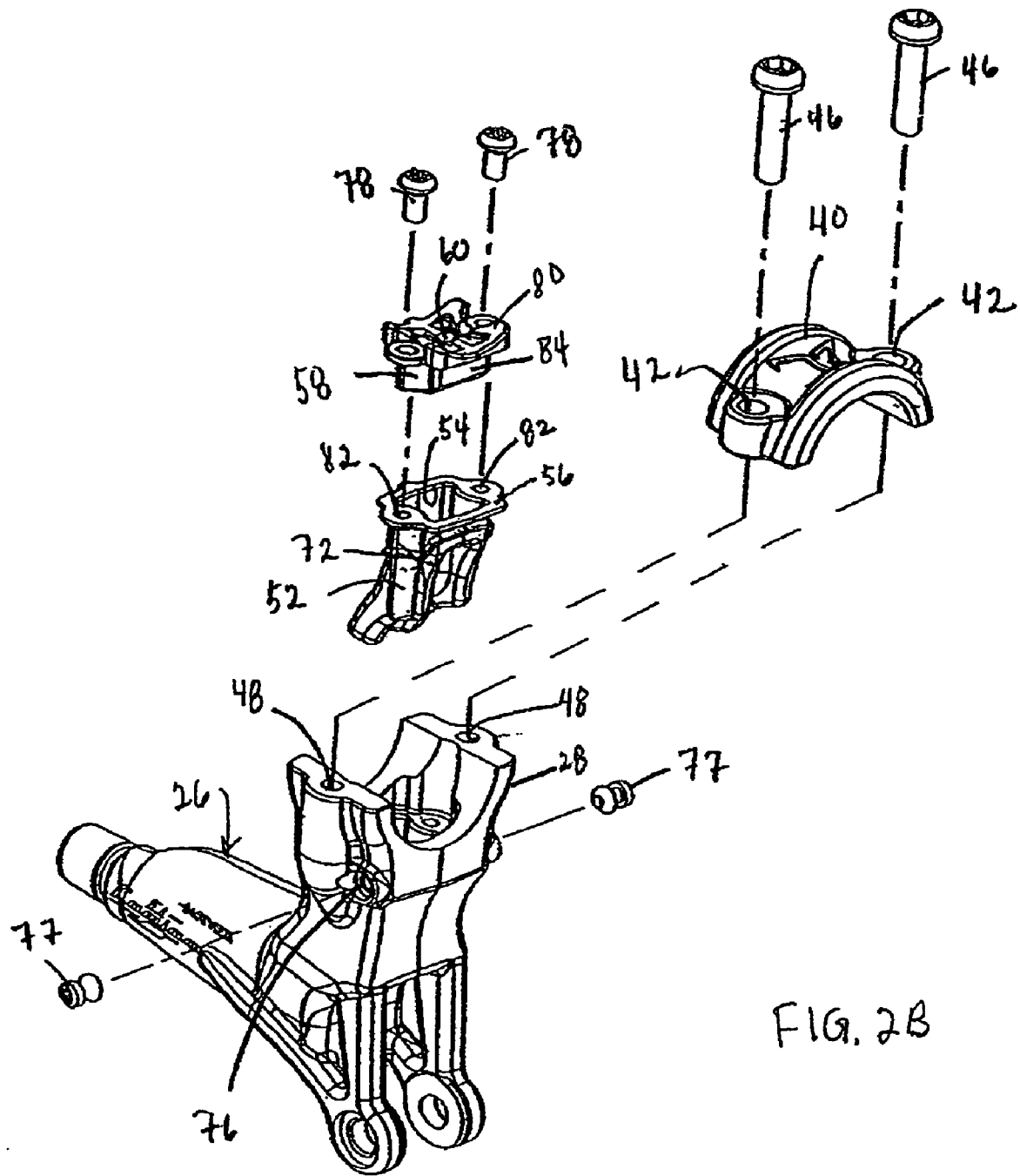
FIG. 2B is an exploded view of the master cylinder of FIGS. 1 and 2A.
Figure 3:
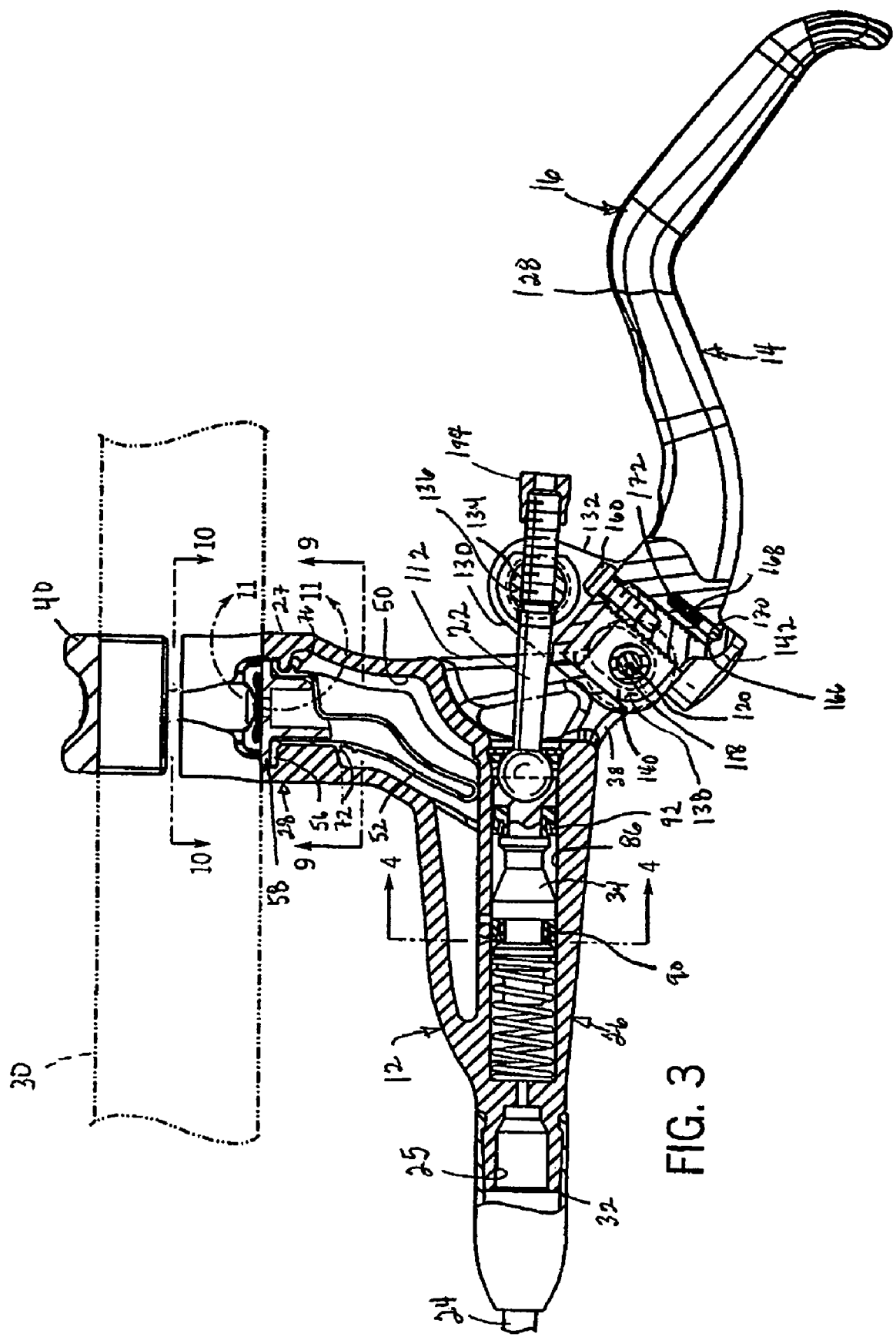
FIG. 3 is a cross-sectional view of the master cylinder and the lever assembly of FIG. 2.

Referring also to FIGS. 2A, 2B and 3, the master cylinder 12 is actuated by the lever 16, which is coupled to the master cylinder 12 by a push rod 22. Actuation of the lever 16 translates the push rod 22 axially of the master cylinder 12 to cause hydraulic fluid (e.g., any incompressible fluid used to generate pressure, such as brake fluid, mineral oil, water, glycol, or the like, the likes of which are used interchangeably hereinout) to flow into the caliper 20 via a brake line 24 coupled to the master cylinder 12 via an inlet/outlet port 25 of the master cylinder 12.

The master cylinder 12 includes a body 26 that is generally L-shaped. On one end 27 of the master cylinder body 24 is a clamp area 28 for attaching the master cylinder body 26 to a handlebar 30 of a vehicle (not shown). An opposite end 32 of the master cylinder body 26 houses a master cylinder piston 34. At the vertex 36 of the L-shaped body 26 is a pivot portion 38 of the master cylinder body 26.

The clamp area 28 of the master cylinder body 26 includes a portion 39 that is arcuate and receives a side of the handle bar 30. A clamp 40 having an arcuate shape receives another side of the handle bar. The clamp 40 includes two ears 42 with bores 44 for receiving fasteners 46, such as screws 46, that are also received in corresponding bores 48 in the clamp area 28.

Referring additionally to FIGS. 3 and 11, a concealed reservoir 50 is formed in the clamp 28 area of the master cylinder body 26 such as through casting. The reservoir 50 houses a reservoir bladder 52 that holds a compressible fluid, such as air. The reservoir bladder 52 is constructed from a flexible material, such as thin rubber, synthetic polypropylene, or the like. The reservoir bladder 52 includes an opening 54 with a flange 56, which is configured to abut a reservoir cover 58 in mating alignment therewith. The reservoir cover 58 is recessed and hidden from view, as the handlebar 30 covers it. This protects the reservoir cover 58 from trees, rocks, the operator of the vehicle, and any other hazard. The reservoir cover 58 includes at least one vent opening 60 to allow the inside of the bladder 52 to be at atmospheric pressure, as shown in FIGS. 2B and 10.

The reservoir cover 58 encloses the reservoir bladder 52 at one end and is connected to it via fasteners 78, such as screws 78, that are received in bores 80 in the reservoir cover 58 and corresponding bores 82 in the reservoir bladder flange 56. The reservoir cover 58 includes a sidewall 84 that, when the reservoir cover 58 encloses the reservoir bladder 52, projects into the reservoir bladder 52. Locating the reservoir 50 and reservoir bladder 52 in the clamp area 28 allows a reduction in the size and weight of the master cylinder 12 while providing enough fluid volume from fluid hydraulic expansion. This is beneficial for high temperatures generated while braking during, e.g., long descents, as high temperatures expand hydraulic fluid. The reservoir bladder 52 accommodates this expansion by compression of fluid, such as air, within the reservoir bladder 52.

Referring also to FIGS. 9 and 11, the reservoir bladder 52 also includes a body 62 defining a central cavity 64 with an inwardly projecting valley 66 defining two outwardly projecting crests 68 on a backside 70 of the bladder 52. The valley 66 and crests 68 permit expansion and contraction of the bladder 52 during operation. Contraction of the bladder 52 accommodates fluid expansion in the master cylinder 12. Expansion of the bladder 52 permits movement of fluid from the reservoir 50 to the master cylinder 12 and the rest of the system 10 when brake pads (not shown) wear or fluid leaks from the braking system 10.

A rib 72 encircles the body 62 approximately one third to one quarter of the way from the flange 56. The rib 72 is further away from the flange 56 on a front side 74 and closer to the flange on the back side 70. The clamp area 28 of the master cylinder body 26 includes bleed ports 76 at the uppermost position of the reservoir 50, i.e. furthermost away from the master cylinder piston 34. There are at least two bleed ports 76. One is for when the master cylinder 12 is installed on the right side of a handlebar 30. The other is for when the master cylinder 12 is installed on the left side of the handlebar 30 such that one of the bleed ports 76 is located at the uppermost position of the reservoir 50 regardless of which side of the handlebar 30 it is installed on. Bleed ports 76 can be closed with fasteners 77, such as screws 77. The rib 72 on the bladder 52 guides air to one of the bleed ports 76, which when installed on a vehicle, is located at the uppermost portion of the reservoir 50.

Figure 4:
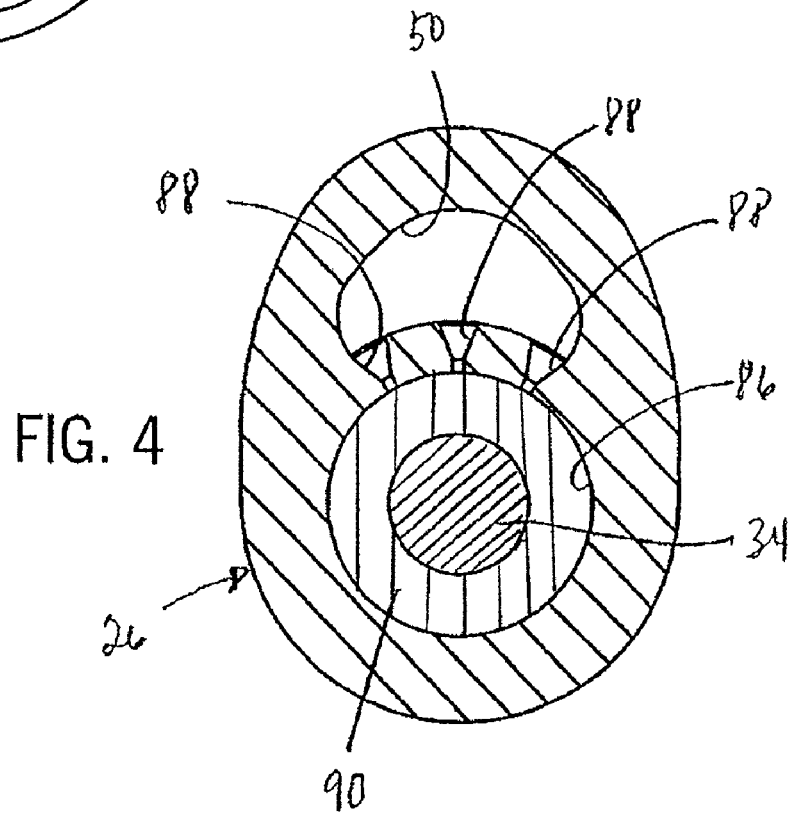
FIG. 4 is a cross-sectional view of the lever assembly of FIGS. 2A, 2B, and 3 taken generally along line 4-4 of FIG. 3 and showing a concealed reservoir of the master cylinder.

A master cylinder bore 86 is located within the master cylinder body 26 and includes the inlet/outlet port 25 that fluidically couples the brake line 24 to the master cylinder 12. The master cylinder bore 86 includes one or more reservoir ports 88 shown in FIG. 4 that fluidically couple the bore 86 to the reservoir 50. The master cylinder bore 86 slidably houses the master cylinder piston 34. The terms slidably, slides, and variations thereof as used herein mean to move linearly over a surface. They do not mean helical or rotational movement. A primary seal 90 and a secondary seal 92 are secured on the master cylinder piston 34 or in the master cylinder body 26 and provide sealing engagement between the master cylinder piston 34 and the bore 86. A return spring 96 biases the master cylinder piston 34 away from the inlet/outlet port 25.

Referring back to FIG. 2A, when the lever 16 is actuated, it moves the push rod 22, which applies pressure to the master cylinder piston 34, which has an end 98 with a concave surface 99. The push rod 22 has an end 100 with a head 102 having a convex surface 104. The concave surface 99 of the piston 34 is coupled to the convex surface 104 of the push rod 22 via a ball and socket joint 106. A retaining washer 108 and a retaining ring 110 fit over the push rod 22 and rest against the head 102 of the push rod 22. The retaining ring 110 resists movement of the retaining washer 108. The washer 108 and ring 110 resist or prevent removal of the head 102 of the push rod 22 from the concave surface 99 of the master cylinder piston end 98. Other methods of attaching various ones of these components are also expressly contemplated hereby.

The pivot portion 38 of master cylinder body 26 includes two V-shaped legs 112 that are spaced apart and receive a portion of the lever assembly 14 therebetween. At the vertex 114 of each leg 112 is a bore 116, that receive a pivot pin 118 defining a fixed fulcrum 120 about which the lever assembly 14 pivots. The pivot pin 118 can include a head 122 and an internal longitudinal bore 124 opposite the head 122. The pivot pin 118 can be secured with a fastener 126, such as a screw 126, that is received in the longitudinal bore 124. This secures the pivot pin 118 in the bores 116 of the legs 112. The pivot pin 118 and fastener 126 can be made from steel or the like. The pivot pin 118 can also be secured in other ways. Other methods of attaching various ones of these components are also expressly contemplated hereby.

The lever 16 includes an input arm 128 having a length L1 (FIG. 1) that is substantially fixed and an output arm 130 having a length L2 that is variable. The output arm 130 moves with respect to the fulcrum 120. The lever 16 is pivotal about the fulcrum 120. The lever input arm 128 is configured to accept a hand of an operator of the vehicle.

The lever output arm 130 includes ears 132 having circular openings 134 therethrough that receive a coupling mechanism 136, discussed below. In one embodiment, force exerted on the lever input arm 128 exerts a pushing force from the lever output arm 130 to the master cylinder piston 34 to actuate it.

The lever assembly 14 also includes an adjuster mechanism 138 housed within the lever 16 and that adjusts the mechanical advantage and the overall feel (e.g., adjusting lever stroke and/or lever effort and/or some combination of one and/or both thereof) of the lever 16. The adjuster mechanism 138 adjusts the output arm length L2 by moving the output arm 130 with respect to the fulcrum 120 as detailed below. This changes the ratio of the output arm length L2 to the input arm length L1.

In one embodiment, the adjuster mechanism 138 includes a slider 140 and a thumbwheel 142 that is coupled to the slider 140. In one embodiment, the slider 140 is generally square shaped with four sides 144 and a top 146 and a bottom 148. A bore 150 is formed from the top 146 to the bottom 148 and receives the pivot pin 118. One side 152 of the slider 140 is concave and threaded and threadably receives the thumbwheel 142, which has corresponding threads 154 thereon. A side 156 opposite the concave side 152 is a convex side 156 to facilitate sliding of the output arm 130 relative to the fulcrum 120. The thumbwheel 142 has a longitudinal bore 158 that accepts a locking screw 160 to oppose movement of the thumbwheel 142. The thumbwheel 142 also has a head 162 that can optionally receive a cap 163. Sides of the head 162 can have a knurled surface (not shown) for contact with a thumb of a vehicle operator. Rotation of the thumbwheel 142 slides the output arm 130 relative to the slider 140 and fulcrum 120 to move the output arm 130 to change the lever output arm length L2.

The thumbwheel head 162 includes depressions 166 on its underside. In one embodiment, the depressions 166 are 120° apart. A spring 168 and a detent 170 biased by the spring 168 are received in a hole 172 in the lever input arm 128. The detent 170 engages a depression 166 and retains the thumbwheel 142 in a desired position. In one embodiment, the thumbwheel 142 can move between 18 positions defined by the spring-loaded detent 170.

The lever ears 132 also include elongated slots 174 that accommodate the pivot pin 118 when the lever 16 moves relative to the slider 140 and the fulcrum 120. Lever bushings 176 project inwardly into the slots 174 and carry the pivot pin 118. Movement of the lever 16 is constrained by the bushings 176 abutting slots 174 at an extreme end of travel within the slots 174.

Figure 5:
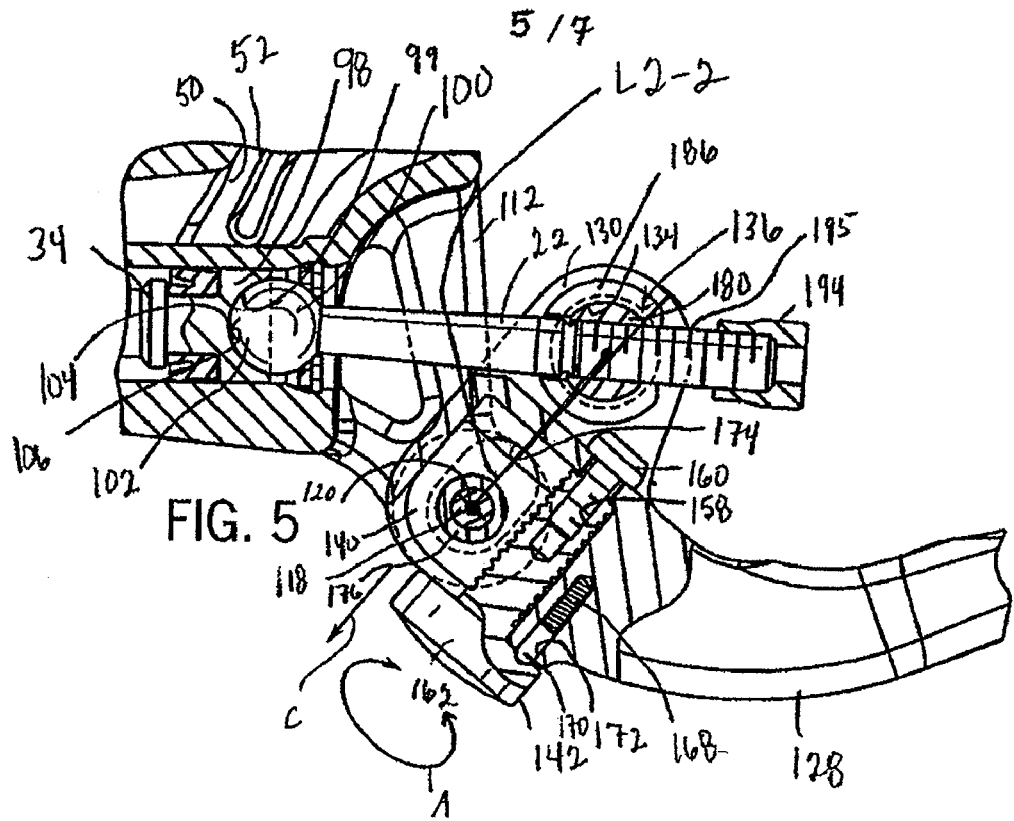
FIGS. 5 and 6 are cross-sectional views of an adjuster mechanism that changes the mechanical advantage of a lever of the lever assembly of FIGS. 2A, 2B, and 3, with FIG. 5 showing an output arm length of the lever that is longer than the corresponding length in FIG. 6.
Figure 6:
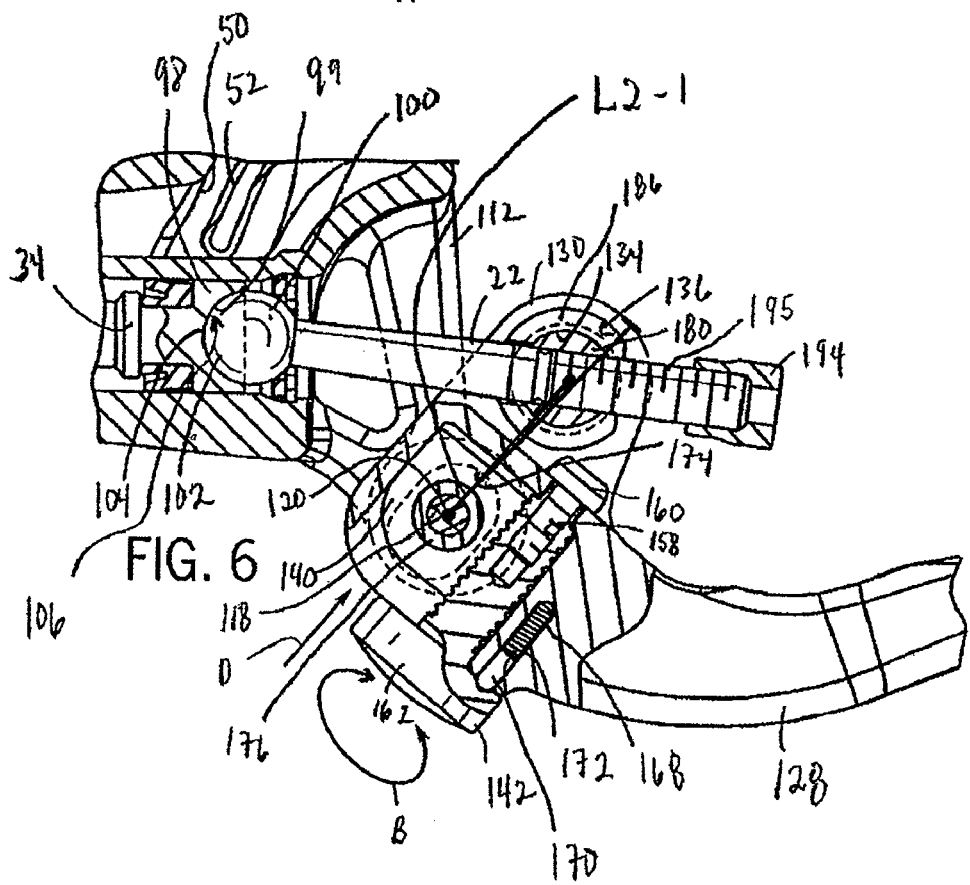

Rotation of thumbwheel 142 moves the lever 16 via the slider 140. Rotation of the thumbwheel 142 in a first direction, as denoted by arrow A in FIG. 5, moves the lever 12 in the direction denoted by arrow C in FIG. 5. Rotation of the thumbwheel 142 in an opposite direction, as denoted by arrow B in FIG. 6, moves the lever 12 in the direction denoted by arrow D in FIG. 6, which is opposite the direction denoted by arrow C in FIG. 5. This lever movement shortens the output arm length L2-1 (FIG. 6) as compared to the output arm length L2-2 (FIG. 5) because the end of output arm 130 is closer to the fulcrum in FIG. 6 as compared to FIG. 5. Both left-handed threads 154 (in one embodiment) and right-handed threads 154 (in another embodiment) on thumbwheel 142 and corresponding threads on slider 140 are expressly contemplated hereby.

Movement of the lever 16 adjusts the lever output arm length L2 relative to the fulcrum 120, which adjusts the ratio of the output arm length L2 to the input arm length L1 to alter the mechanical advantage and the overall feel of the lever 16. In one embodiment, the mechanical advantage is adjustable up and down by ten percent. The mechanical advantage of the lever 16 can be adjusted in real time by the operator without any tools during operation of the vehicle.

The coupling mechanism 136 couples the lever output arm 130 to the push rod 22 and minimizes or prevents rotation of the push rod 22. In one embodiment, force exerted on the lever input arm 128 exerts a pushing force from the lever output arm 130 to the master cylinder 12 via the push rod 22. The coupling mechanism 136, as well as the ball and socket joint 106, reduce rotational force exerted on the push rod 22 by pivotal movement of the lever output arm 130.

The coupling mechanism 136 is located in circular openings 178 in the lever output arm 130. In one embodiment, the coupling mechanism 136 includes a bushing 180 that is received in the openings 178. The bushing 180 has a bore 182 that is perpendicular to a longitudinal axis of the bushing 180 and a flat 184 that is perpendicular to the bore 182. The coupling mechanism 136 also includes two sleeves 186 that slide over opposing ends of the bushing 180. The sleeves 186 each include a flange 188 and an ear 190 that includes an arcuate portion 192 that threadably accepts the push rod 22. The sleeves 186 can be fabricated from nylon or another compressible material. The push rod 22 includes threads 195 on the end opposite the head 102. The push rod 22 is received in the bushing bore 182 and the arcuate portions 192 of the sleeves 186. When the push rod 22 is received in the arcuate portion 192 of the compressible sleeves 186, the arcuate portion 192 is deformed to retain the push rod 22.

Referring now to FIGS. 7 and 8, the lever assembly 14 can additionally include a lever adjustment knob 194 that adjusts a height of the lever 16 relative to the handlebar 30. The knob 194 is coupled to the push rod 22 for the master cylinder 12. Preferably, the lever adjustment knob 194 is fixedly attached to the push rod 22. Push rod 22 threadably receives bushing 180, which is captured by lever output arm 130 via sleeves 186. Rotating the knob 194 turns the push rod 22, which moves the bushing 180 helically along the push rod 22. Because bushing 180 is captured by the lever output arm 130, lever output arm 130 moves when the bushing 180 moves. Rotating the knob 194 in a first direction, as denoted by arrow A in FIG. 7, moves input arm 128 away from the handlebar 30 to a first height H1, as denoted by arrow C. Rotating the knob 194 in a second direction, as denoted by arrow B in FIG. 8, moves input arm 128 towards the handlebar 30 to a second height H2, as denoted by arrow D. Both left-handed threads 195 (in one embodiment) and right-handed threads 195 (in another embodiment) on the push rod 22 and corresponding threads on the bushing 180 are expressly contemplated hereby.

Referring to FIGS. 7 and 8, the height of the lever 16 relative to handlebar 30 is adjusted by rotating the lever adjustment knob 194. Rotation of knob 194 is denoted by arrow A in FIG. 7 and arrow B in FIG. 8. This allows the operator of the vehicle to increase or decrease the lever 16 reach without tools. Adjustment of the lever reach can be done while an operator is riding a vehicle having the lever adjustment knob 194 and without any tools.

In use, upon actuation of the lever input arm 128, the lever 16 pivots about the fulcrum 120 and pivotally moves the lever output arm 130. A force is applied to the master cylinder 12 by the lever output arm 130 to actuate the master cylinder piston 34. Upon master cylinder actuation, hydraulic fluid is forced through the brake line 24 to move pistons (not shown) of the caliper 20 into a position in which one or more pads (not shown) on the caliper 20 frictionally engage the rotating disc 18.

The mechanical advantage and the overall feel (e.g., effort or stroke or both required to achieve a desired deceleration) of the lever 16 is changed by rotating the thumbwheel 142. Rotation of the thumbwheel 142 slides the lever 16 relative to the fulcrum 120 and slider 140. Sliding the lever 16 changes the lever output arm length L2. Sliding the lever 16 does not change the fulcrum 120. The rotation of the thumbwheel 142 does not require locking the thumbwheel 142 because the detent 170 engages one of the depressions 166 in the underside of the thumbwheel 142. The vehicle can be operated while the operator rotates the thumbwheel 142.

Heat is generated as a result of frictional contact between the pads (not shown) and the disc 18. Heat expands the brake fluid. The reservoir bladder 52 accommodates the additional volume of the expanded brake fluid by expulsion of air within the reservoir bladder 52 to atmosphere via the vent opening 60 in the reservoir cover 58. Hence, the effect of the heat is effectively compensated for. This allows the master cylinder 12 to be physically smaller and to weigh less than a conventional master cylinder 12, yet still allow for appropriate fluid expansion.

When less fluid is present in the brake system, e.g., when fluid leaks, air can also be added to the bladder 52 via the vent opening 60 in the reservoir cover 58. This is automatically done because the vent opening 60 is open to atmospheric pressure. Adding air to the bladder 52 can also be beneficial when pads (not shown) wear, requiring further movement of the pad to contact the disc 18.

The braking system 10 can be bled by opening a lower bleed port (not shown) on the braking system 10. One of the bleed ports 76 in the clamp area 28 of the master cylinder body 26 is also opened. The bleed port 76 that is opened is the one that is at the uppermost position of the reservoir 50 on the installed master cylinder 12. New brake fluid is added to the braking system 10 through the lower port under pressure, displacing the old fluid, until new fluid flows from the upper bleed port 76. After all the old, contaminated fluid, and/or old fluid and the like are removed from the braking system 10 through the bleed port 76, the lower bleed port and bleed port 76 are closed. The rib 72 on the bladder 52 and/or the configuration of the reservoir 50 guides air, which moves by buoyancy, to the bleed port 76. For example, as is seen in FIG. 11, both the rib 72 and a sidewall of the reservoir 50 guides air to the bleed port 76. This could also be accomplished with the rib 72 alone or the configuration of the reservoir 50 alone. During fluid changes, the master cylinder 12 does not need to be reoriented because the bleed port 76 on the installed master cylinder 12 is at the uppermost position of the reservoir 50.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A lever assembly comprising:
   (A) a lever including an input arm having a substantially fixed length and an output arm having a variable length, the output arm length being the distance between (1) a fulcrum about which the lever pivots and that is fixed with respect to a master cylinder body and (2) a contact surface of the lever and a force transmitting member, wherein the lever output arm (1) is moveable with respect to the fulcrum and (2) is configured to be pivotable about a master cylinder, the master cylinder having a master cylinder piston situated therein;
   (B) an adjuster mechanism that is housed within the lever and that pivots on the fulcrum, wherein movement of the adjuster mechanism moves the entire lever linearly with respect to the fulcrum along a longitudinal axis of an elongated slot, and changes a ratio of the output arm length to the input arm length; and
   (C) a push rod having a first end and a second end, wherein the first end is pivotally secured to the force transmitting member and the second end is pivotally secured to the master cylinder piston.

2. The lever assembly of claim 1, wherein the adjuster mechanism comprises:
   (A) a slider that pivots on the fulcrum; and
   (B) a thumbwheel coupled to the slider, wherein rotation of the thumbwheel slides the lever relative to the fulcrum to adjust the output arm length of the lever.

3. The lever assembly of claim 2, wherein the thumbwheel is threadably coupled to the slider.

4. The lever assembly of claim 1, wherein force exerted on the lever input arm exerts a pushing force from the lever output arm to a master cylinder.

5. The lever assembly of claim 1, further comprising a coupling mechanism that adjusts a distance of the lever relative to a handlebar.

6. The lever assembly of claim 5, wherein the coupling mechanism comprises:
   (A) a bushing having (1) a bore that is perpendicular to a longitudinal axis of the bushing, and (2) a flat that is perpendicular to the bore; and
   (B) sleeves configured to be received on ends of the bushing and including ears having an arcuate surface, wherein a push rod is received in the bore of the bushing and the arcuate surfaces of the ears.

7. The lever assembly of claim 6, further comprising a lever adjustment knob coupled to the push rod via the bushing, wherein the bushing is captured within the lever output arm, and wherein rotation of the lever adjustment knob moves the bushing helically along the push rod.

8. The lever assembly of claim 1, wherein the lever output arm actuates a master cylinder.

9. The lever assembly of claim 8, wherein the master cylinder piston has an end with a concave surface; and
   the second end of the push rod has a convex surface that is coupled to the concave surface via a ball and socket joint.

10. A method of adjusting a mechanical advantage of a lever comprising:
    (A) rotating a thumbwheel coupled to a slider that pivots on a fulcrum that is fixed with respect to a master cylinder body and housed within the lever, moving the lever with respect to the fulcrum by rotating the thumbwheel, the lever including an output arm, the output arm length being the distance between (1) the fulcrum and (2) a contact surface of the lever and a force transmitting member, the lever output arm being at least indirectly pivotally secured to one end of a push rod, and wherein an opposite end of the push rod is pivotally secured to a master cylinder piston situated in the master cylinder body;
    (B) sliding the entire lever linearly with respect to the fulcrum along a longitudinal axis of an elongated slot; and
    (C) adjusting a ratio of a length of the output arm of the lever to an input arm length of the lever.

11. The method of claim 10, wherein the rotating step does not require locking the thumbwheel.

12. The method of claim 10, further comprising:
    (A) exerting a force on an input arm of the lever; and
    (B) applying a pushing force on a hydraulic master cylinder with an output arm of the lever.

13. The method of claim 10, wherein the rotating step can occur during operation of a vehicle.

14. A lever assembly comprising:
    (A) a lever that is pivotal about a fulcrum that is fixed with respect to a master cylinder body, the lever including an input arm having a substantially fixed length and an output arm having a variable length with respect to the fixed fulcrum, the output arm length being the distance between (1) the fulcrum and (2) a contact surface of the lever and a force transmitting member, wherein the lever output arm (1) is moveable with respect to the fulcrum and (2) is configured to contact the force transmitting member; and
    (B) an adjuster mechanism that is housed within the lever and that pivots on the fulcrum, wherein movement of the adjuster mechanism moves the entire lever linearly with respect to the fulcrum along a longitudinal axis of an elongated slot, and changes a ratio of the output arm length to the input arm length;
    (C) a push rod having a first end and a second end, wherein the first end is pivotally secured to the force transmitting member and the second end is pivotally secured to a master cylinder piston situated in the master cylinder body.

15. The lever assembly of claim 14, wherein the adjuster mechanism comprises:
    (A) a slider that pivots on the fulcrum; and
    (B) a thumbwheel coupled to the slider, wherein rotation of the thumbwheel slides the lever relative to the fulcrum to adjust the output arm length of the lever.

16. The lever assembly of claim 15, wherein the thumbwheel is threadably coupled to the slider.

17. The lever assembly of claim 14, wherein force exerted on the lever input arm exerts a pushing force from the lever output arm to a master cylinder.

18. The lever assembly of claim 14, further comprising a coupling mechanism that adjusts a distance of the lever relative to a handlebar.

19. The lever assembly of claim 18, wherein the coupling mechanism comprises:
    (A) a bushing having (1) a bore that is perpendicular to a longitudinal axis of the bushing, and (2) a flat that is perpendicular to the bore; and
    (B) sleeves configured to be received on ends of the bushing and including ears having an arcuate surface, wherein a push rod is received in the bore of the bushing and the arcuate surfaces of the ears.

20. The lever assembly of claim 19, further comprising a lever adjustment knob coupled to the push rod via the bushing, wherein the bushing is captured within the lever output arm, and wherein rotation of the lever adjustment knob moves the bushing helically along the push rod.

21. The lever assembly of claim 14, wherein the lever output arm actuates a master cylinder.

22. The lever assembly of claim 21, wherein the master cylinder piston has an end with a concave surface; and the second end of the push rod has a convex surface that is coupled to the concave surface via a ball and socket joint.

\* \* \* \* \*